July 25, 1967 E. J. SAUR 3,332,800

METHOD FOR PRODUCING A SUPERCONDUCTOR COMPRISING A NIOBIUM-TIN ALLOY COATING

Filed Oct. 29, 1962

United States Patent Office 3,332,800
Patented July 25, 1967

3,332,800

METHOD FOR PRODUCING A SUPERCONDUCTOR COMPRISING A NIOBIUM-TIN ALLOY COATING

Eugen J. Saur, Giessen, Germany, assignor to National Research Corporation, Cambridge, Mass., a corporation of Massachusetts Filed Oct. 29, 1962, Ser. No. 233,961
1 Claim. (Cl. 117—213)

The present application is a continuation-in-part of my copending application, S.N. 208,925, filed July 10, 1962, and now Patent 3,252,832. In the copending application, I described a new process for the fabrication of superconductor electrical devices, such as wire and the like. Broadly stated, the process comprises the preparation of alloy coatings on a ductile base to produce a composite coated article which can be bent into desired shapes such as solenoids, motor windings, spools, and used in a cryogenic fluid medium as cryotrons, electromagnets, magnetic bearings, gyroscopes, armatures, filed coils, magnetic pumps and plasma containers. The alloys of these coatings are "hard superconductors." That is, they possess a considerable brittleness and exhibit superconducting properties which are superior to those of the soft metals in terms of higher transition temperatures, field tolerance and critical current carrying capacity. The substrate to be coated is selected as the higher melting constituent of the alloy. The other constituent material is applied as a coating with a thickness on the order of 1 mil and diffused into the surface of the substrate by heating to produce the alloy as a surface diffusion layer on the substrate.

The present invention relates to an improvement in this fabrication process. It is the object of this invention to provide a method of treating the substrate so that the subsequently applied diffusion coating will be uniform and adherent, exhibiting improved electric properties.

In accordance with a preferred embodiment of the invention, the substrate is suspended over a bath of the coating material. Both the bath and the coating material are held at substantially the same elevated temperature. While it is possible to complete the coating process in this manner, it is preferred to terminate this preliminary treatment by dipping the substrate into the bath and then post heating the coated substrate, as taught in my copending application.

The invention accordingly comprises the improved process of fabricating superconductor devices and the several steps of the process and the relation and order of these steps with respect to each other, which are more fully described below and illustrated in the accompanying drawings, and the scope of application of which is indicated in the appended claims.

The substrate is selected from the materials—niobium, tantalum and vanadium. The coating material is selected from the materials—tin, aluminum, indium, gallium, germanium or silicon. In the preferred embodiment described below, a niobium wire is coated with tin. The surface diffusion layer produced by the heat treatment comprises substantial amounts of the compound $Nb_3Sn$. However, it should be understood that the substrate can take various forms, such as ribbon, rod, plates, tubes, as well as castings of complex shape. The coating is generally continuous. However, known masking techniques may be used to form discontinuous coatings, e.g., to form a wire with alternating segments of the hard superconductor alloy for use in a cryotron, of the type disclosed in Patent 2,958,836 of McMahon.

Figure 1:
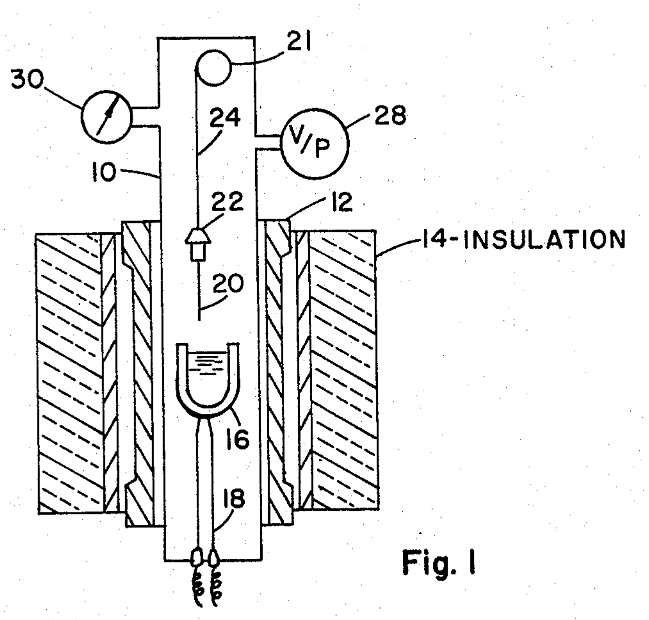
FIG. 1 shows a coating apparatus, which are used in applying the improved process of the invention to the samples discussed below.
Figure 2:
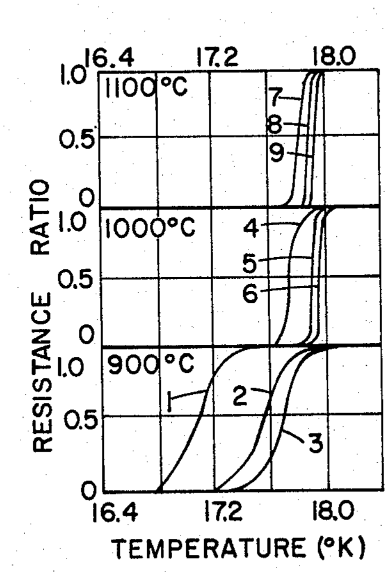
FIG. 2 is a composite graph showing the transition of $Nb_3Sn$ coated niobium wire to the superconducting state at decreasing temperatures.

Referring now to FIG. 1, there is shown a tubular furnace tube 10, made of quartz surrounded by a protective wall of aluminum oxide. Heating is applied by a silicon carbide electric heating element 12 surrounded by insulation 14. A quartz crucible 16 holds the molten bath of coating material. Thermocouple 18 measures the temperature of the bath. The arrangement in the furnace is such that there is essentially no difference in temperature between the region of the bath 16 and the wire 20. A sample wire 20 to be coated is held in plumb bob 22 suspended by a string 24 from reel 26. The furnace is evacuated by a vacuum pumping system 28. Pressure gauge 30 is used to monitor furnace pressure. Preliminary and post heat treatments of the wire 20 are conducted by holding it in the position shown whereby it is subject to a surrounding vapor of the coating material. The reel 26 is rotated via a rotary vacuum feed through (not shown) to dip the wire into the bath for short periods of time.

In my copending application, I listed dipping as a preferred coating technique. The correlation of the present improvement with the dipping techniques is explored more fully in the following examples:

*Example 1*

The furnace shown in FIG. 1 was evacuated to a pressure of $10^{-5}$ torr. A 20-mil diameter niobium wire of commercial purity was inserted in the holder. The tin in the bath was of commercial purity. The wire and tin bath were raised to a temperature of 900° C. and the wire was held above the bath for 60 minutes, then dipped in the bath for 5 minutes and then held above the bath for 15 minutes.

Another run was made with 60 minutes preliminary heating, 15 minutes dipping and 60 minutes post heating, all heating being at 900° C.

A third run was made with 60 minutes preliminary heating, 60 minutes dipping and 240 minutes post heating, all heating being at 900° C.

*Example 2*

Three runs were made substantially as in Example 1 save that the cycle temperature was 1000° C. and the times of treatment were:

| Preliminary Heating, minutes | Dipping, minutes | Post Heating, minutes |
|---|---|---|
| 60 | 5 | 15 |
| 60 | 15 | 60 |
| 60 | 60 | 240 |

*Example 3*

Three runs were made substantially as in Example 1, save that the cycle temperature was 1100° C., and the times of treatment were:

| Preliminary Heating, minutes | Dipping, minutes | Post Heating, minutes |
|---|---|---|
| 60 | 1 | 5 |
| 60 | 5 | 15 |
| 60 | 15 | 60 |

The samples from the three runs were inserted in cryogenic refrigerators and their transition curves were plotted (resistance ratio vs. temperature).

Resistance ratio is the ratio of the actual resistivity of the sample to the low resistivity which would be expected (by calculation or measurement in a strong magnetic field) in the absence of a superconducting transition. High magnetic fields and critical currents are indicated by the high transition temperatures of these samples.

Figure 3:
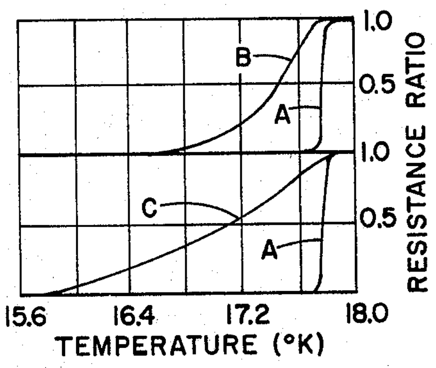
FIG. 3 is a similar composite graph showing the effect of deformation on the transition of wire to the superconducting state.

The runs of Examples 1–3 are plotted on the composite graph of FIG. 3 and are numbered as follows:

| | Time of Dipping, minutes | Time of Post Heating, minutes |
|---|---|---|
| Example 1–900° C.: | | |
| Curve 1 | 5 | 15 |
| Curve 2 | 15 | 60 |
| Curve 3 | 60 | 240 |
| Example 2–1000° C.: | | |
| Curve 4 | 5 | 15 |
| Curve 5 | 15 | 60 |
| Curve 6 | 60 | 240 |
| Example 3–1100° C.: | | |
| Curve 7 | 1 | 5 |
| Curve 8 | 5 | 15 |
| Curve 9 | 15 | 60 |

The samples of Examples 1–3 were all ductile. They were capable of being wound into solenoids. Winding into very tight coils caused a lowering of transition temperatures. However, the wires remained superconductive. FIG. 3 shows a composite transition graph for samples wound into tight spools. In each of the graphs, curve A indicates the response of the samples before deformation and curves B and C indicate the response after winding into a tight spool. In the upper graph the sample was wound into a 5 mm. Inner diameter spool, producing the curve B for transition to the superconductive state. In the lower graph, the sample was wound to a tighter spool of 3 mm. inner diameter, to produce the flattened curve C.

The success of this improved method is accounted for by the following explanation. Molten tin does not readily wet the niobium surface. However, preliminary heating in vacuum tends to drive off volatile impurities to improve the wettability of the surface. Some impurities are driven off the wire and others are diffused deeper into the wire. The presence of tin vapor further improves the wettability of the surface when the substrate is maintained in the same temperature range as the tin since tin can then enter the niobium by gaseous diffusion and improve the wettability of the surface.

Once the niobium surface is rendered wettable, limitations are placed on the times of dipping and post heating. Excessive thickness of the surface diffusion layer comprising the brittle compound $Nb_3Sn$ will ruin the ductility of the final product. Most of the diffusion of the tin into the niobium takes place during the dipping and it is this step which must be carefully limited in view of the good wettability afforded by the preliminary heating.

The post heating completes diffusion and assures homogeneous layers of $Nb_3Sn$. This is effectively carried out over a time range of 5 to 240 minutes as shown in the above examples. This can be carried out in a tin vapor to inhibit evaporation of tin from the wire. However, it can also be carried out in vacuum or an inert atmosphere.

It should be understood that reference to niobium wire in this application also includes a wire of another material with a niobium coating. Similarly, the nobium, tantalum and vanadium substrates contemplated by this application can be made of other materials with a surface layer of the high melting constituent of the final alloy coating.

As noted in my copending application, the coating process may comprise electroplating, vacuum evaporation, rolling on or drawing, instead of dipping. In all of these alternatives, the preliminary wettability treatment of the present invention may be used to advantage. Gaseous diffusion alone may be used to produce the final superconductive sample. However, the electrical properties realized by such method are generally not as good as those realized by the dipping techniques of the preferred embodiment.

What is claimed is:

A method of producing elongated superconductors suitable for winding into magnets and the like, comprising the steps of subjecting an elongated niobium base to the vapor pressure of tin by evacuating a furnace to the high vacuum range and heating the wire and a bath of tin in said furnace to a temperature in the range 900–1200° C. while holding the base over the bath, subsequently dipping the base into the bath for a period of time from 1 minute to 60 minutes, removing the base from the bath and heating it at the same temperature for from 5 to 240 minutes.

References Cited

UNITED STATES PATENTS

| | | | |
|---|---|---|---|
| 936,637 | 10/1909 | Kirk | 117—67 X |
| 3,181,936 | 5/1965 | Denney et al. | 29—194 |

ALFRED L. LEAVITT, *Primary Examiner.*

JOSEPH B. SPENCER, JOSEPH REBOLD, *Examiners.*

W. L. JARVIS, *Assistant Examiner.*